(12) United States Patent
Wredenhagen

(10) Patent No.: US 8,417,051 B2
(45) Date of Patent: Apr. 9, 2013

(54) SYSTEM AND METHOD FOR FEATURE EMPHASIS AND DE-EMPHASIS IN IMAGE PROCESSING

(75) Inventor: Gordon F. Wredenhagen, Toronto (CA)

(73) Assignee: Broadcom Corporation, Irvine, CA (US)

(*) Notice: Subject to any disclaimer, the term of this patent is extended or adjusted under 35 U.S.C. 154(b) by 1003 days.

(21) Appl. No.: 12/463,872

(22) Filed: May 11, 2009

(65) Prior Publication Data

US 2009/0279785 A1 Nov. 12, 2009

Related U.S. Application Data

(60) Provisional application No. 61/071,645, filed on May 9, 2008.

(51) Int. Cl.
*G06K 9/40* (2006.01)
*G06K 9/46* (2006.01)
*G06K 9/66* (2006.01)

(52) U.S. Cl. ........ 382/261; 382/190; 382/254; 382/260; 382/263; 382/266

(58) Field of Classification Search ............ 382/190, 382/254, 260, 261, 263, 266
See application file for complete search history.

(56) References Cited

U.S. PATENT DOCUMENTS

| | | | | |
|---|---|---|---|---|
| 5,231,677 A * | 7/1993 | Mita et al. | | 382/266 |
| 6,370,279 B1 * | 4/2002 | Paik | | 382/268 |
| 6,823,086 B1 * | 11/2004 | Dolazza | | 382/261 |
| 6,842,543 B2 * | 1/2005 | Woodell et al. | | 382/274 |
| 6,876,778 B2 * | 4/2005 | Lin et al. | | 382/266 |
| 7,355,755 B2 * | 4/2008 | Suino et al. | | 358/3.15 |
| 7,386,158 B2 * | 6/2008 | Yamada | | 382/132 |
| 2011/0206293 A1 * | 8/2011 | Sasaki | | 382/274 |

* cited by examiner

*Primary Examiner* — Matthew Bella
*Assistant Examiner* — Jose M Torres
(74) *Attorney, Agent, or Firm* — Thomas | Horstemeyer, LLP

(57) ABSTRACT

A system and method for emphasizing and/or de-emphasizing features in a digital image. In an embodiment of the invention, the image is processed by a series of filters, which decompose the image into a series of sub-bands. Each sub-band is then processed by an emphasis circuit. In an embodiment of the invention, the emphasis circuit is connected to an input representing a particular sub-band. Each filter, therefore, is connected to its own respective emphasis circuit. The result is a series of emphasis circuit outputs, which are then combined. The result of the combination is the processed image, containing one or more emphasized or deemphasized features. In an alternative embodiment of the invention, the sub-bands are combined in a weighted fashion. The sum of the weighted sub-bands is then applied to a single emphasis circuit. The output of the emphasis circuit, in this embodiment, is a processed image having one or more emphasized or deemphasized features.

21 Claims, 7 Drawing Sheets

SYSTEM AND METHOD FOR FEATURE EMPHASIS AND DE-EMPHASIS IN IMAGE PROCESSING

CROSS-REFERENCE TO RELATED APPLICATIONS/INCORPORATION BY REFERENCE

This patent application makes reference to, claims priority to and claims benefit from U.S. Provisional Patent Application Ser. No. 61/071,645 filed on May 9, 2008.

The above stated application is hereby incorporated herein by reference in its entirety.

FIELD OF THE INVENTION

Certain embodiments of the invention relate to image processing. More specifically, certain embodiments of the invention relate to a method and system for emphasis and de-emphasis in image processing

BACKGROUND OF THE INVENTION

Feature emphasis and de-emphasis are common image processing operations. A feature in an image can be as straightforward as an edge or as complicated as a complex fractal pattern. Image sharpening is one example of feature emphasis. Image smoothing is an example of the opposite process, feature de-emphasis.

One purpose of emphasizing a feature may be to make the image look better or to explicitly exaggerate the feature. A useful application of feature emphasis is edge enhancement. A useful application of feature de-emphasis is noise suppression. Sharpening an image may be required for several reasons. An image that was sharp at its native resolution can often lack sharpness once it has been enlarged, so that sharpening may be needed after enlargement. Alternatively, perceived image sharpness is also a function of the observer's physical distance from the screen. In order to make an image appear adequately sharp, one must be cognizant of the observer's position relative to the screen. Whatever the reason, it is of fundamental importance to be able to adjust the level of sharpness in an image to make it perceptually pleasing.

There are many approaches to feature emphasis and de-emphasis. Of the many ways to perform some sort of feature enhancement, image sharpening is among them. Sharpening algorithms typically perform some sort of edge manipulation. Many approaches, however, are linear methods. Linear approaches to sharpening are fraught with problems. For instance, a constant poly-phase finite impulse response (FIR) filter will act the same way on all image content, so it will exacerbate noise as well as make edges more "sharp." But so-called sharpening linear filters—those that have some gain in the frequency mid-band—also come with another often unwanted side-effect—Gibb's phenomenon, which is more commonly referred to as ringing. The performance of linear filters that sharpen is particularly poor in regions of the image where there is relatively little content, that is, areas of the image that are very flat. In these regions a sharpening filter only serves to enhance noise. While some overshoot and undershoot is necessary to create an effect that sharpens an image, when ringing occurs, there are many repetitive artifacts close to an edge that are visually unappealing.

It would therefore be desirable to have a feature emphasis/de-emphasis circuit that operates in accordance with the following principles. Such a circuit: 1) should not aggravate areas when the feature is not present; 2) should identify the feature in question; 3) should not alter the feature's fundamental properties, e.g., the size of the feature, although such a circuit may alter the feature's range, i.e., contrast; and 4) should not contain heuristic components. In the more specific context of image sharpening, such a circuit or process should: 1) be benign in regions that are flat or relatively flat; 2) add overshoot and undershoot (emphasis and de-emphasis) in a controlled fashion; 3) not ring; and, 4) not contain any arbitrary user-defined thresholds. Depending on the exact nature of the emphasis/de-emphasis problem, these principles may assume a more specific connotation.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for emphasis and de-emphasis in image processing, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1:
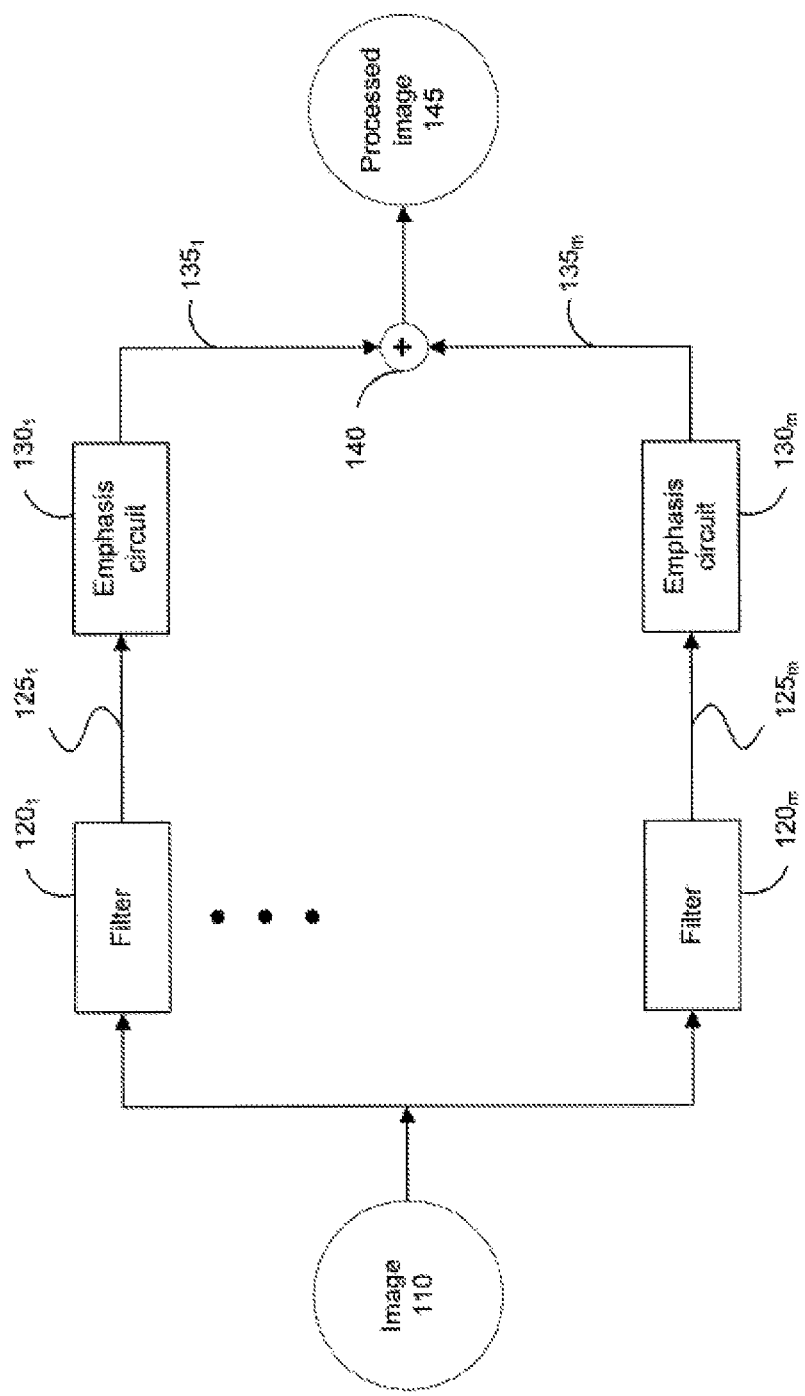
FIG. 1 is a block diagram illustrating an embodiment of the invention in which sub-bands of an image are each input to a distinct emphasis circuit.

A preferred embodiment of the present invention is now described with reference to the figures, where like reference numbers indicate identical or functionally similar elements. Also in the figures, the leftmost digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other systems and applications.

Embodiments of a sharpening system and associated process are described herein. This system and circuit are used to sharpen images by altering the overshoot and undershoot (emphasis and de-emphasis) in the edges of the image content. The same circuit can be used to selectively reduce what is deemed to be noise, i.e., regions of the image where the local variability is low. The circuit and process are non-linear in an embodiment of the invention.

Embodiments of the circuit and process described herein can be used in an arbitrary dimensional space. For example, in audio processing they can be used to sharpen transition and suppress noise in the audio signal; in a two-dimensional application such as image processing, they can be used to sharpen the image and suppress spurious detail; and in three-dimensional mappings of a solid, e.g., computed axial tomography (CAT) scans, the same circuit can be used to create sharper three dimensional images.

The invention described herein includes a system and method for emphasizing and/or de-emphasizing features in a digital image. In an embodiment of the invention, the image is processed by a series of filters, which decompose the image into a series of sub-bands. Each sub-band is then processed by an emphasis circuit. In an embodiment of the invention, the emphasis circuit is connected to an input representing a particular sub-band. Each filter, therefore, is connected to its own respective emphasis circuit. The result is a series of emphasis circuit outputs, which are then combined. The result of the combination is the processed image, containing one or more emphasized or deemphasized features.

In an alternative embodiment of the invention, the sub-bands are combined in a weighted fashion. The sum of the weighted sub-bands is then applied to a single emphasis circuit. The output of the emphasis circuit, in this embodiment, is a processed image having one or more emphasized or deemphasized features.

The emphasis circuit comprises an emphasis orientation module, a feature detector module, and an edge orientation module, in an embodiment of the invention. These modules generate an emphasis orientation information, feature detection information, and edge orientation information. An output that is a function of the emphasis orientation information, the feature detector information, and the edge orientation information, is then combined with a first user input. The difference between this output and the original image is then determined. This difference is then combined with a second user input and passed through a limiter. The limiter serves to regulate the amount of emphasis or de-emphasis placed on the image. In an embodiment of the invention, the limiter output can be passed through a pattern injection circuit. This circuit can be used to mark a specific feature in the image. The output of the pattern injection circuit, therefore, includes a feature bearing some sort of marking or pattern. If the pattern injection circuit is used, the output of the pattern injection circuit can be used as the final processed image. Alternatively, if a pattern injection circuit is not used, the limiter output can be used as the final processed image.

An embodiment of the system of the invention is illustrated in FIG. 1. An image 110 is passed to each of a plurality of filters, identified as $120_1$ to $120_m$. Each filter generates a respective sub-band of the original image 110. Any image can be decomposed into a series of sub-bands. Sub-bands, in their most common form, can correspond to frequency bands. In FIG. 1, any sub-band can be acted upon independently. Filter $120_1$ therefore generates a sub-band $125_1$ for example. Each sub-band 125 is then input to its own respective emphasis circuit. These are shown as emphasis circuits $130_1$ through $130_m$. The respective outputs of the emphasis circuits are shown as emphasis outputs $135_1$ through $135_m$. The emphasis circuit outputs are then combined in combiner 140. The output of combiner 140 is processed image 145.

Figure 2:
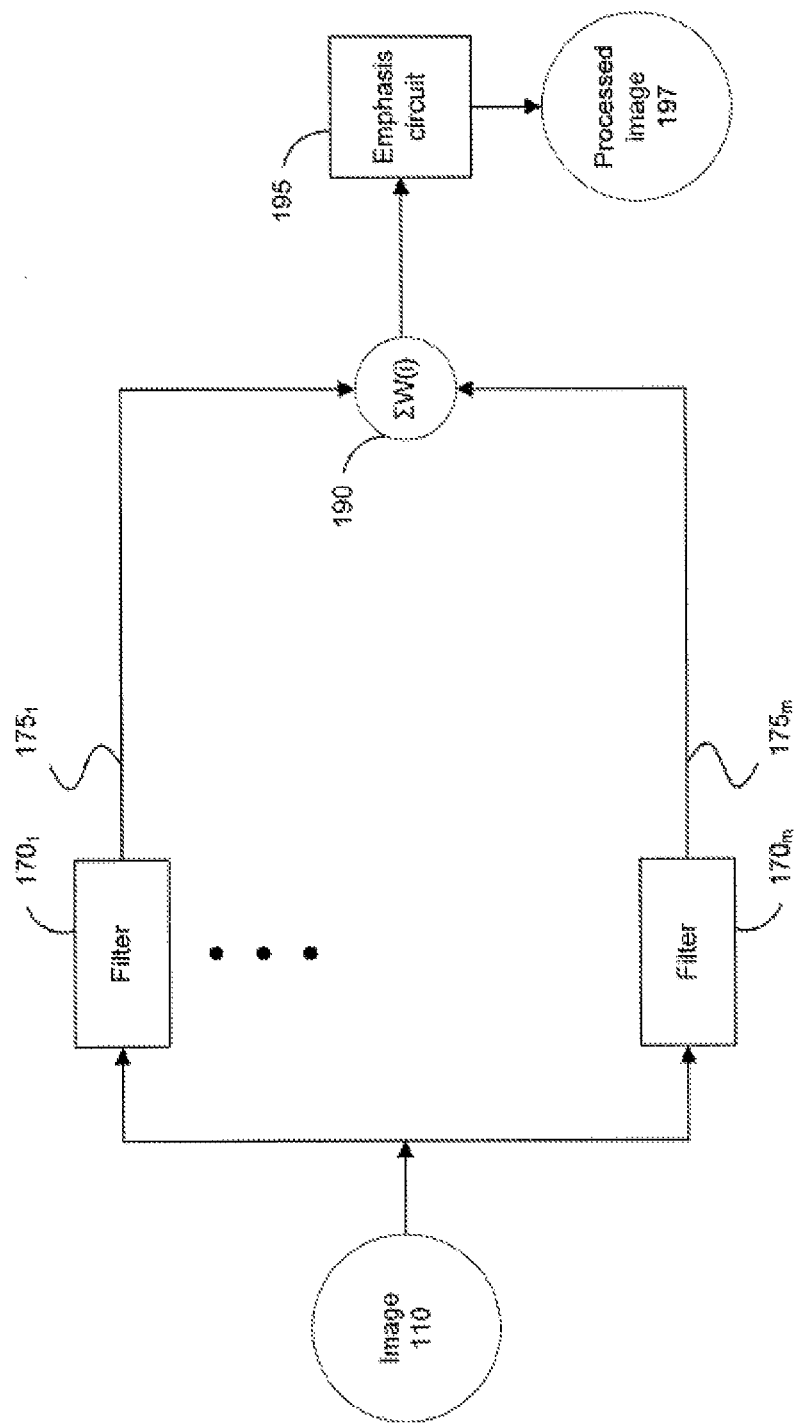
FIG. 2 is a block diagram illustrating an alternative embodiment of the invention, wherein sub-bands of an image are combined before being processed by an emphasis circuit.

FIG. 2 illustrates an alternative embodiment of the invention. As before, image 110 is input to a plurality of filters, illustrated in FIG. 2 as filters $170_1$ through $170_m$. In this embodiment, the sub-bands that are output from the filters are shown as sub-bands $175_1$ through $175_m$. A weighted sum of the sub-bands is created in combiner 190. The output of combiner 190 is then input into emphasis circuit 195. The output of emphasis circuit 195 is processed image 197.

Note that the embodiment of FIG. 2 allows for band selectivity. In an embodiment of the invention, band selectivity is a user-defined option that can be programmed to activate one or more bands for sharpening or for noise suppression. Band selection can be a function of factors including, but not limited to, image resolution.

Figure 3:
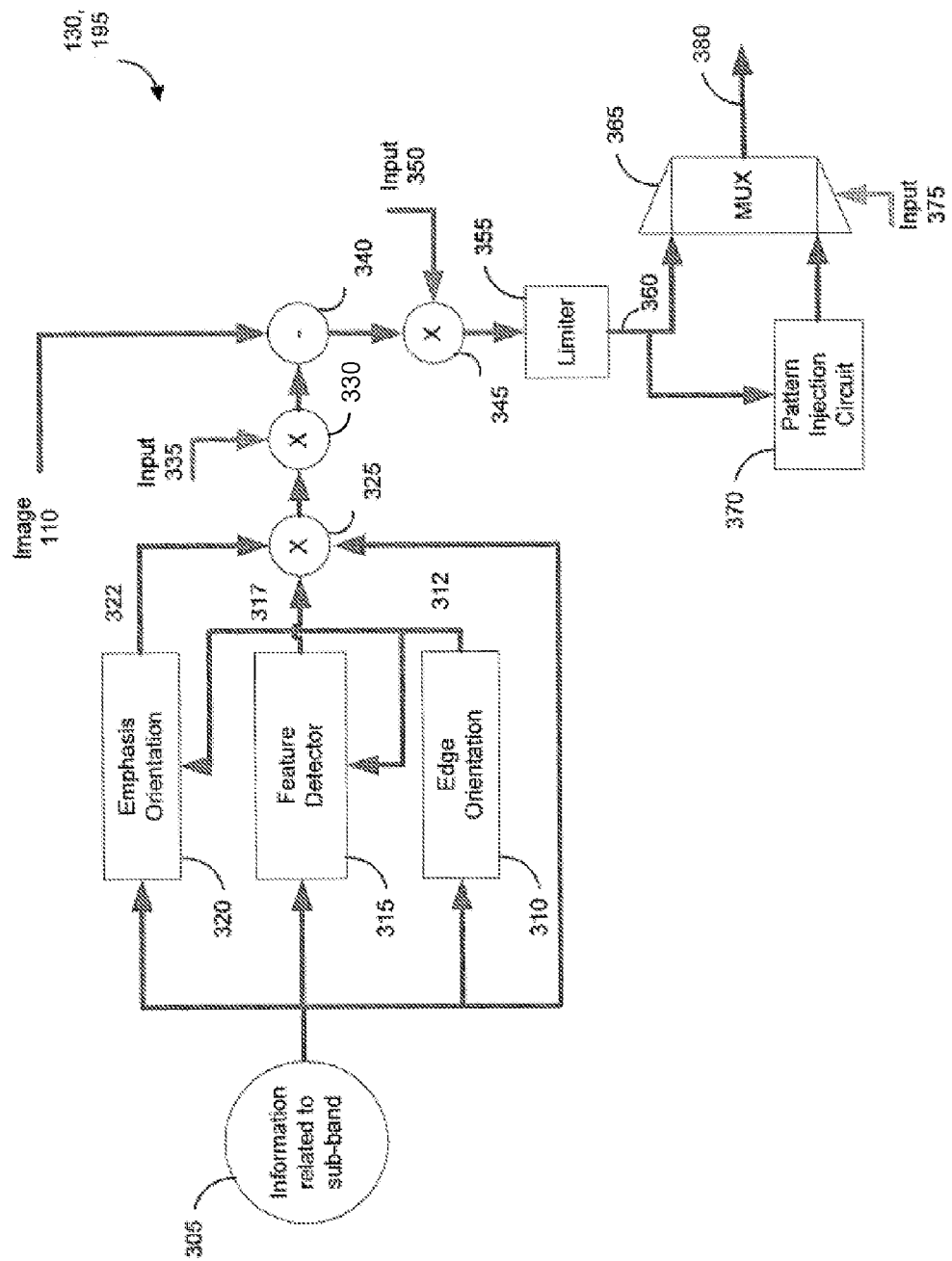
FIG. 3 is a block diagram illustrating an emphasis circuit, according to an embodiment of the invention.

The emphasis circuit of the previous two figures is illustrated in greater detail in FIG. 3, according to an embodiment of the invention. This circuit includes several functions to collectively accomplish feature emphasis/de-emphasis. These functions include a feature detection function, an emphasis orientation function, and an edge orientation function. The illustrated circuit includes components corresponding to these functions and operating in concert, along with additional input control parameters, to perform the sharpening function.

Note that a feature can have many orientations. Three are of primary interest: the feature is present, the feature is absent, or the feature is present by virtue of its surroundings. The latter requires some further explanation. Suppose an emphasis orientation function is defined to be local gradient. The gradient can be positive, zero, or negative. The negative gradient is an example of the feature being present by virtue of its surroundings. Similarly, convexity may be positive, absent (i.e., zero), or negative. These quantities can lie anywhere in the domain of real numbers, but the real number line is still defined by three regions—positive, zero and negative numbers.

Referring to FIG. 3, the data that is input to the emphasis circuit is shown as information 305. This information is shown as information related to a sub-band. In the A filter can be used to signal whether the local image content has a positive or negative emphasis orientation in an embodiment of the invention. One example of emphasis orientation is curvature. A test for curvature is to measure convexity, although in other embodiments of the invention more sophisticated tests can be used. Convexity can be computed by applying a time-invariant finite impulse response filter to the data context of the embodiment of FIG. 1, information 305 represents the output of one of the filters. In the context of the embodiment of FIG. 2, information 305 represents the output of combiner 190. The emphasis circuit comprises an emphasis orientation module 320, a feature detector module 315, and an edge orientation module 310. Information 305 is input to each of these three modules. Edge orientation module 310 receives information 305, and outputs edge orientation information 312. Edge orientation information 312 represents the orientation of an edge, as it appears in information 305.

The function of the edge orientation module 310 is to determine the direction of the edge in image content. For example, in an embodiment of the invention, anisotropic diffusion could be used to accomplish this, as would be known to a person of skill in the art. Alternatively, in a different implementation, anisotropic diffusion is not required. In a two-pass feature emphasis approach, for example, the results of the first and second pass can be combined together in a weighted additive fashion. The output of this module, edge orientation information 312, is input into feature detector module 315, along with information 305. Feature detector module 315 is used to identify which specific parts of the image content are to be acted upon. Such parts could be areas that have a specific signature, flat, smooth, film-grain noise, etc. These are detected using the feature detector module 315 and are subject to enhancement in subsequent processing. Feature detector module 315 outputs feature detector information 317, and will be described in greater detail below.

Edge orientation information 312 is also input into emphasis orientation module 320, along with information 305. This module produces emphasis orientation information 322. Emphasis orientation information 322 represents information regarding the orientation of emphasis or de-emphasis, to be applied to the processing of image 110. The emphasis orientation module 320 measures the orientation of the feature in local image content, consistent with the direction specified by the edge orientation information 312.

A filter can be used to signal whether the local image content has a positive or negative emphasis orientation in an embodiment of the invention. One example of emphasis orientation is curvature. A test for curvature is to measure convexity, although in other embodiments of the invention more sophisticated tests can be used. Convexity can be computed by applying a time-invariant finite impulse response filter to the data such as [−1 2 −1] in one dimension. In general, however, the curvature could be determined in as sophisticated and selective a manner as desired.

Emphasis orientation information 322 is combined with feature detector information 317, and edge orientation information 305 in combiner 325.

The output of combiner 325 is entered into combiner 330, along with user-defined input 335. This input, as well as input 350 described below, can be viewed as a user defined gain. These serve to amplify or attenuate the degree of sharpening or noise reduction. The output of combiner 330 is then used, along with image 110, as inputs to difference logic 340. The difference between image 110 and the output of combiner 330 is then used as input to combiner 345, along with user defined input 350. The output of combiner 345 is then input to limiter 355. Limiter 355 serves to regulate the amount of emphasis or de-emphasis of a feature. The limiter 355 can be a non-linear function (mapping) that can be used to arbitrarily regulate the amount of undershoot or overshoot added to an edge. The result is limiter output 360.

In the illustrated embodiment, limiter output 360 is directed to multiplexer 365. Limiter output 360 is also directed to pattern injection circuit 370. The pattern injection circuit 370 is used to add a predefined pattern to the content in strength proportional to detected feature. Pattern injection circuit 370 may, for example, mark a particular feature with some icon pattern or other form of highlighting. The output of pattern injection circuit 370 is then input to multiplexer 365. Whether the output of pattern injection circuit 370 or limiter output 360 is ultimately output from multiplexer 365 is determined by user input 375. The output of multiplexer 365 is emphasis circuit output 380, which corresponds to the processed image.

Figure 4:
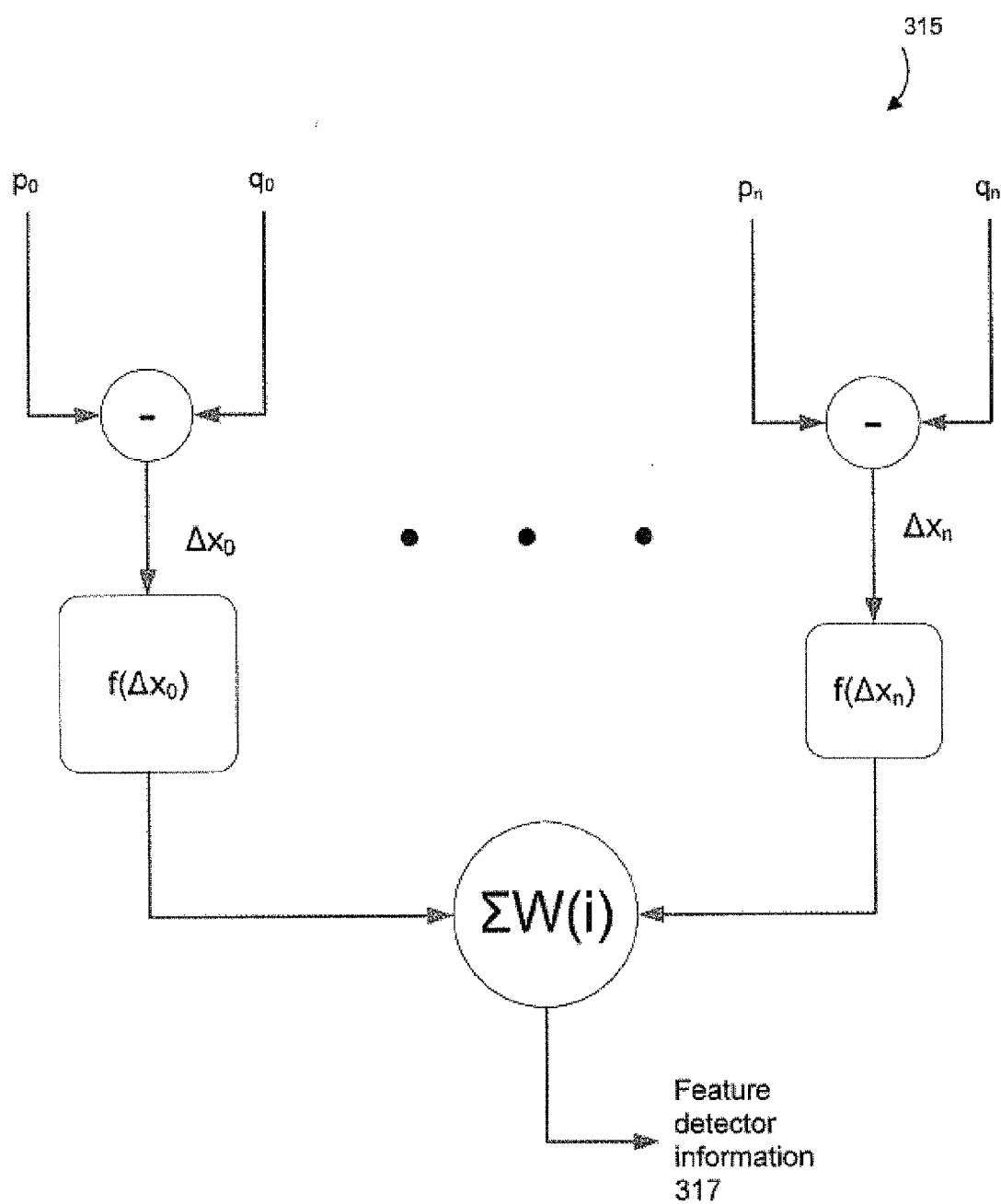
FIG. 4 is a diagram illustrating the processing of a feature detector according to an embodiment of the invention.

Feature detector 315 is illustrated in greater detail in FIG. 4, according to an embodiment of the invention. The feature detector 315 operates on information 305, but in particular, operates on pairs of pixels taken from information 305. The illustrated embodiment shows n+1 pairs of pixels (p, q). These are shown as pairs $(p_o, q_o)$ through $(p_n, q_n)$. For any given pair of pixels $p_i$ and $q_i$, these two pixels represent pixels on opposite sides of a give feature. As shown in FIG. 4, the difference between the pixels in each pair is determined. For example, the difference between $p_o$ and $q_o$ is shown as $\Delta x_0$. Each $\Delta x$ is then input to a function f. In an embodiment of the invention, the function f is the absolute value function. In alternative embodiments, a user may choose other functions for f. The values of f are then combined in a weighted combiner operation, resulting in feature detector information 317. Here the weights W(i) provide selectivity towards different types of patterns that we wish to identify and emphasis or de-emphasis as the case may be.

Figure 5:
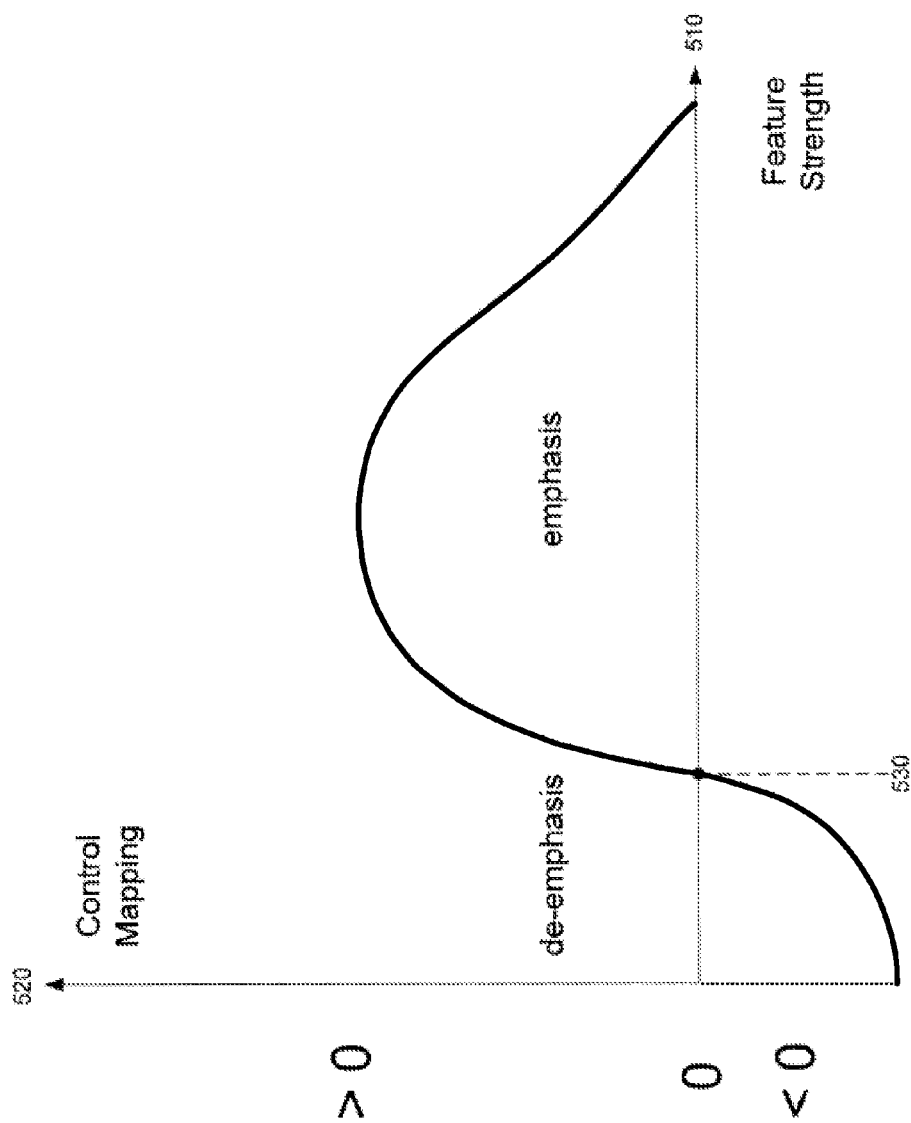
FIG. 5 is a graph showing the application of emphasis and de-emphasis to a feature, depending on the feature strength, according to an embodiment of the invention.

FIG. 5 illustrates the application of the invention to an image. The feature strength mapping circuit is designed to map the feature strength and confine it to a range that is predetermined. The mapping can be arbitrarily complex or it can be a simple piecewise-linear curve. The one shown in FIG. 5 has both negative and positive components. When the feature strength is in a certain region of the mapping, the feature is de-emphasized (i.e. attenuated) and when it is in another region, the feature is emphasized. The zero crossing point can be considered as an indication of the noise ceiling, or the point at which the system of the invention can begin suppressing unwanted detail or texture. In this case, it is entirely possible for the mapping to be adaptive so that its composition is controlled by the influence of several factors—some related to noise, others to user-preferences, and so on. The X axis 510 represents the strength of a feature. The Y axis 520 represents the amount of emphasis or de-emphasis (i.e., the amount of control) applied as a function of the feature strength. If the feature strength exceeds the point indicated by 530, emphasis is applied. For features having the strength less than 530, de-emphasis or attenuation takes place.

Figure 6:
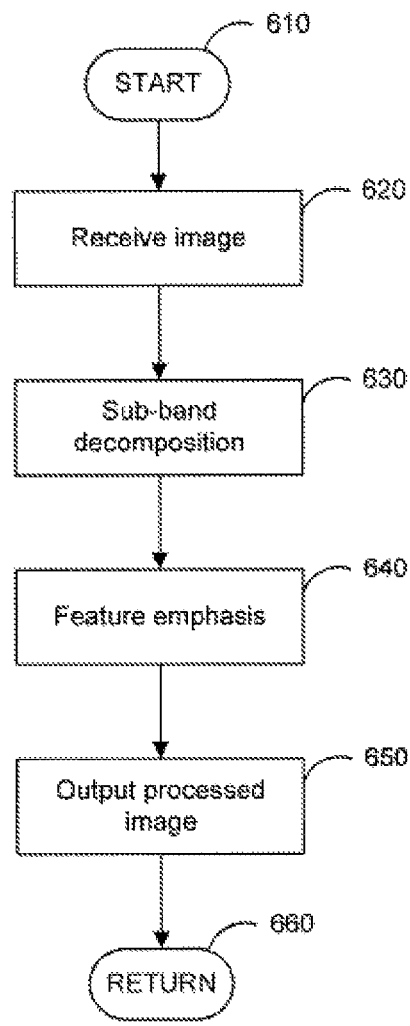
FIG. 6 is a flowchart illustrating the overall processing of an embodiment of the invention.

FIG. 6 illustrates the processing of the invention, according to an embodiment. The process begins at step 610. At step 620, the image is received. In step 630, the image is decomposed into sub-bands. In step 640, feature emphasis is performed. This step is described in greater detail below. In step 650, the processed image is output. The process concludes at step 660.

Figure 7:
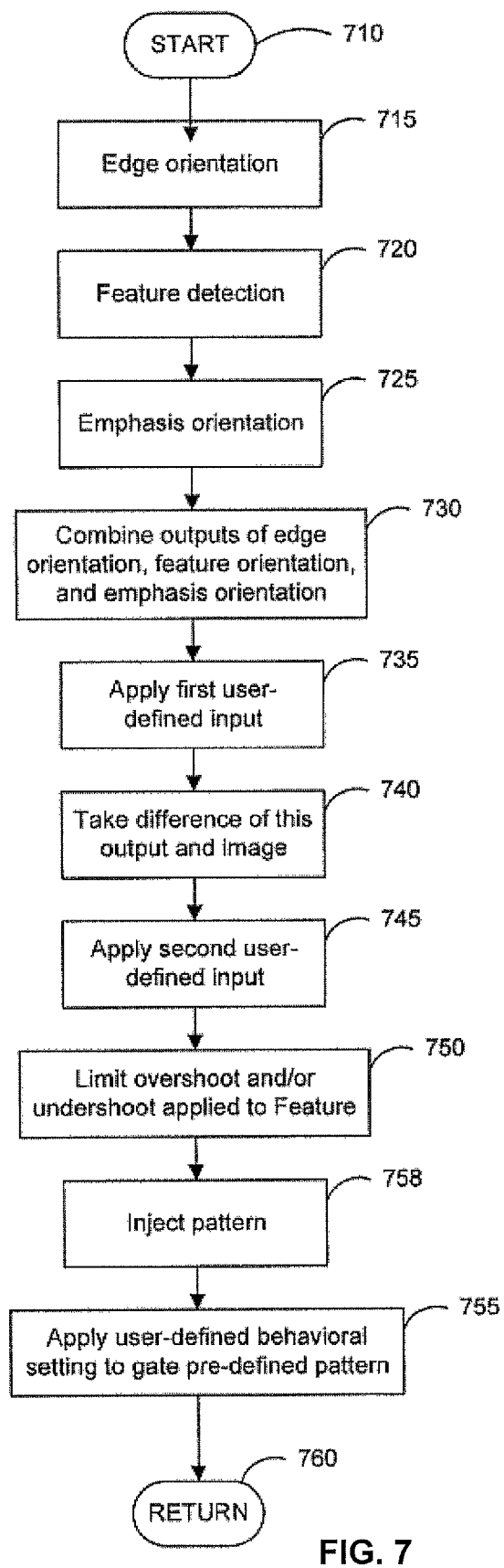
FIG. 7 is a flowchart illustrating the process of feature emphasis and de-emphasis, according to an embodiment of the invention.

The step of feature emphasis is illustrated in greater detail in FIG. 7. Here, the process begins at step 710. In step 715, edge orientation is performed. In step 720, feature detection is preformed. In step 725, emphasis orientation is performed. The outputs of steps 715-725 are combined in step 730. In an embodiment of the invention, these outputs are combined according to the logic illustrated in FIG. 3.

In step 735, a first user defined input is applied to the result of step 730. In step 740, the difference between the image and the output of step 735 is determined. A second user defined input is then applied in step 745. In step 750, the extent of emphasis or de-emphasis that is applied to the feature is limited. In step 755, another user defined input is applied. This particular input is used to determine whether or not the emphasis circuit output includes an injected pattern. The process concludes at step 760.

The method and system described above can act to achieve both sharpening and noise suppression. They can also do these functions concurrently. Depending on the degree of complexity, the circuit may be very differentiated or not at all. That is, if only one band is deemed important from a sharpening point-of-view, then the circuit can be modified to perform the sharpening operation on only that band. Moreover, noise suppression may act on the same band, or on a separate band. It is possible to perform only the noise suppression option without sharpening.

Noise suppression can be handled in a similar manner to feature enhancement, except that the orientation of the enhancement correction is reversed thereby causing a de-emphasis of the feature in question. In this way it is possible to selectively de-emphasis edges or any other feature in question so the circuit can act as a smoother as well. The negative portion of the mapping shown in FIG. 5 is the part of the mapping that causes the de-emphasis.

It is also possible within the framework of the present invention to envision a circuit that adapts its parameters depending on the type of content. For example, a deinterlaced source may be treated differently from progressive, or there may be a component of the circuit that is resolution dependent.

It is to be appreciated that the Detailed Description section, and not the Abstract section, is intended to be used to interpret the claims. The Abstract section may set forth one or more but not all exemplary embodiments of the present invention as contemplated by the inventor, and thus, is not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A system for feature emphasis and de-emphasis in processing an image, comprising:
   a plurality of sub-band filters that are configured to receive an image, wherein each sub-band filter is configured to output a respective sub-band associated with said image; and
   at least one emphasis circuit configured to receive information related to said sub-bands, perform edge orientation, detect a feature in said image, perform emphasis orientation, and output a processed image,
   wherein each of said at least one emphasis circuit comprises:
      an edge orientation module configured to receive said information related to at least one of said sub-bands, and to output edge orientation information;
      a feature detector module configured to receive said information related to at least one of said sub-bands and said edge orientation information, and to output feature detector information;
      an emphasis orientation module configured to receive said information related to at least one of said sub-bands and said edge orientation information, and to output emphasis orientation information;
      a first combiner and wherein said information related to at least one sub-band is combined with said feature detector information and said emphasis orientation information in the first combiner, to produce a first combiner output; and
      a second combiner, wherein said first combiner output is combined with a first user defined input in the second combiner, to produce a second combiner output.

2. The system of claim 1, wherein said at least one emphasis circuit comprises an emphasis circuit for each sub-band filter, such that each sub-band filter is configured to output its sub-band to its respective emphasis circuit.

3. The system of claim 2, further comprising a combiner configured to combine an output from each emphasis circuit, and produce a processed image.

4. The system of claim 1, further comprising a combiner configured to receive said sub-bands, and output a weighted sum of said sub-bands.

5. The system of claim 4, wherein said at least one emphasis circuit comprises a single emphasis circuit configured to receive said weighted sum of said sub-bands.

6. The system of claim 1, wherein said emphasis circuit comprises a third combiner, and wherein a difference between said image and said second combiner output is determined, and combined with a second user defined input in the third combiner to produce a third combiner output.

7. The system of claim 6, wherein said emphasis circuit comprises a limiter configured to receive said third combiner output, to regulate the emphasis and de-emphasis applied to said feature, and to produce a limiter output.

8. The system of claim 7, wherein said emphasis circuit comprises:
   a pattern injection circuit configured to apply a pattern to the limiter output and to produce a marked image; and
   a multiplexer configured to receive said limiter output, said marked image, and a third user-defined input, and to output said one of said limiter output and marked image, chosen by said third user input as the processed image.

9. A system for feature emphasis and de-emphasis in processing an image, comprising:
   a plurality of sub-band filters that are configured to receive an image, wherein each sub-band filter is configured to output a respective sub-band associated with said image; and
   at least one emphasis circuit configured to receive information related to said sub-bands, perform edge orientation, detect a feature in said image, perform emphasis orientation, and output a processed image,
   wherein each of said at least one emphasis circuit comprises:
      an edge orientation module configured to receive said information related to at least one of said sub-bands, and to output edge orientation information;
      a feature detector module configured to receive said information related to at least one of said sub-bands and said edge orientation information, and to output feature detector information, wherein said feature detector module is configured to:

(a) determine a difference $\Delta x_i$ between pixel data $p_i$ and $q_i$ for each of a plurality of pairs $(p_i, q_i)$, where $0 \leq i \leq n$ and where each $p_i$ and $q_i$ are pixels in said image on opposite sides of a feature;
(b) apply a function to each $\Delta x_i$; and
(c) calculate a weighted sum of $f(\Delta x_i)$ for a plurality of values $f(\Delta x_i)$;

and an emphasis orientation module configured to receive said information related to at least one of said sub-bands and said edge orientation information, and to output emphasis orientation information.

10. The system of claim 9, wherein said function f is an absolute value function.

11. A method of emphasizing a feature in an image, comprising:
(a) receiving the image;
(b) decomposing the image into sub-bands;
(c) performing edge orientation, feature detection, and emphasis orientation on information related to the sub-bands to produce a first combiner output;
(d) combining the first combiner output with a first user-defined input to create a second combiner output;
(e) creating a difference between the image and the second combiner output;
(f) combining the difference with a second user-defined input to create a third combiner output;
(g) regulating the emphasis and de-emphasis in the third combiner output, creating a limiter output;
(h) applying a pattern to the limiter output to produce a marked image; and
(i) multiplexing the marked image with the limiter output on the basis of a third user-defined input to create an emphasis circuit output.

12. The method of claim 11, wherein said step (c) comprises:
(i) performing edge orientation on the information related to the sub-bands to produce edge orientation information;
(ii) performing feature detection on the information related to the sub-bands on the basis of the edge orientation information to produce feature detection information;
(iii) performing emphasis orientation on the information related to the sub-bands on the basis of the edge orientation information, to produce emphasis orientation information; and
(iv) combining the information related to the sub-bands, feature detection information, and emphasis orientation information into a first combiner to produce the first combiner output.

13. The method of claim 12, wherein said step (c)(ii) comprises:
A. for each of a plurality of pairs of pixels $(p_i, q_i)$ determining a difference $\Delta x_i$ where $p_i$ and $q_i$ are pixels on opposite sides of a feature;
B. calculating a function $f(\Delta x_i)$ for each $x_i$; and
C. calculating a weighted sum of a plurality of values $f(\Delta x_i)$ to produce feature detection information.

14. The method of claim 13, wherein the function f is the absolute value function.

15. The method of claim 11, wherein said step h comprises applying the pattern to the feature to thereby highlight the feature.

16. The method of claim 11, wherein the third user-defined input determines whether the limiter output or the marked image is output as the emphasis circuit output.

17. The method of claim 11, wherein the information related to the sub-bands comprises a weighted sum of the sub-bands.

18. The method of claim 17, wherein the emphasis circuit output comprises the processed image.

19. The method of claim 11, wherein said information related to the sub-bands comprises a particular sub-band.

20. The method of claim 19, wherein said steps (c) through (i) are performed for each of a plurality of sub-bands, resulting in a corresponding plurality of emphasis circuit outputs.

21. The method of claim 20, further comprising:
(j) combining the corresponding plurality of emphasis circuit outputs to produce the processed image.

\* \* \* \* \*